(12) United States Patent
Stackpole

(10) Patent No.: US 8,287,791 B2
(45) Date of Patent: Oct. 16, 2012

(54) PROCESS OF PRODUCING A REMOVABLE MAGNETIC LINER

(75) Inventor: Benjamin Stackpole, Gray, GA (US)

(73) Assignee: TEMA Isenmann, Inc., Cincinnati, OH (US)

( * ) Notice: Subject to any disclaimer, the term of this patent is extended or adjusted under 35 U.S.C. 154(b) by 363 days.

(21) Appl. No.: 12/646,304

(22) Filed: Dec. 23, 2009

(65) Prior Publication Data

US 2011/0151177 A1    Jun. 23, 2011

(51) Int. Cl.
  *B29B 13/00* (2006.01)
  *B29C 45/14* (2006.01)
  *B32B 3/06* (2006.01)

(52) U.S. Cl. ........ 264/271.1; 264/279; 428/99; 428/900

(58) Field of Classification Search .................. None
  See application file for complete search history.

(56) References Cited

U.S. PATENT DOCUMENTS

| | | | |
|---|---|---|---|
| 2,720,311 A | 10/1955 | Benjamin | |
| 3,020,562 A * | 2/1962 | Reynolds | 4/583 |
| 3,034,140 A * | 5/1962 | Reynolds | 4/583 |
| 3,546,709 A | 12/1970 | Cross | |
| 3,659,887 A | 5/1972 | Marquette | |
| 4,245,863 A | 1/1981 | Carter | |
| 4,643,475 A | 2/1987 | Neumann | |
| 4,763,945 A | 8/1988 | Murray | |
| 4,896,911 A | 1/1990 | Duke | |
| 4,909,559 A | 3/1990 | Zettle | |
| 4,986,590 A | 1/1991 | Patti et al. | |
| 4,997,227 A | 3/1991 | Falzone et al. | |
| 5,038,829 A | 8/1991 | Panella | |
| 5,050,925 A | 9/1991 | Brown | |
| 5,069,951 A | 12/1991 | Egan | |
| 5,275,460 A | 1/1994 | Kraus | |
| 5,312,145 A | 5/1994 | McNeil | |
| 5,320,392 A | 6/1994 | Hart | |
| 5,806,909 A | 9/1998 | Wise | |
| 6,027,057 A * | 2/2000 | Miles | 241/182 |
| 6,303,241 B1 * | 10/2001 | Miles | 428/812 |
| 6,468,678 B1 | 10/2002 | Dahlin et al. | |
| 6,619,717 B2 | 9/2003 | Gardiner | |
| 7,273,644 B2 | 9/2007 | Linker | |
| 7,344,032 B2 | 3/2008 | LaVeine et al. | |
| 2003/0138620 A1 | 7/2003 | Fonseca | |
| 2006/0201894 A1 | 9/2006 | Wood et al. | |

OTHER PUBLICATIONS

International Searching Authority, The International Search Report and The Written Opinion of the International Searching Authority, or the Declaration, PCT/US2010/61497, Feb. 24, 2011, 12 pgs.
United States Patent and Trademark Office, Office Action, U.S. Appl. No. 12/819,674, Aug. 24, 2012, 19 pgs.

* cited by examiner

*Primary Examiner* — Christina Johnson
*Assistant Examiner* — Benjamin Schiffman
(74) *Attorney, Agent, or Firm* — Wood, Herron & Evans, LLP

(57) ABSTRACT

A removable, magnetically-affixed liner, preferably comprising ultra-high molecular weight polyethylene or polyurethane rubber materials, is provided for affixation to a ferrous substrate material. The liner is configured so that the magnetic attachment element is not easily removed or dislodged from the liner, without regard to choice of liner material utilized.

19 Claims, 6 Drawing Sheets

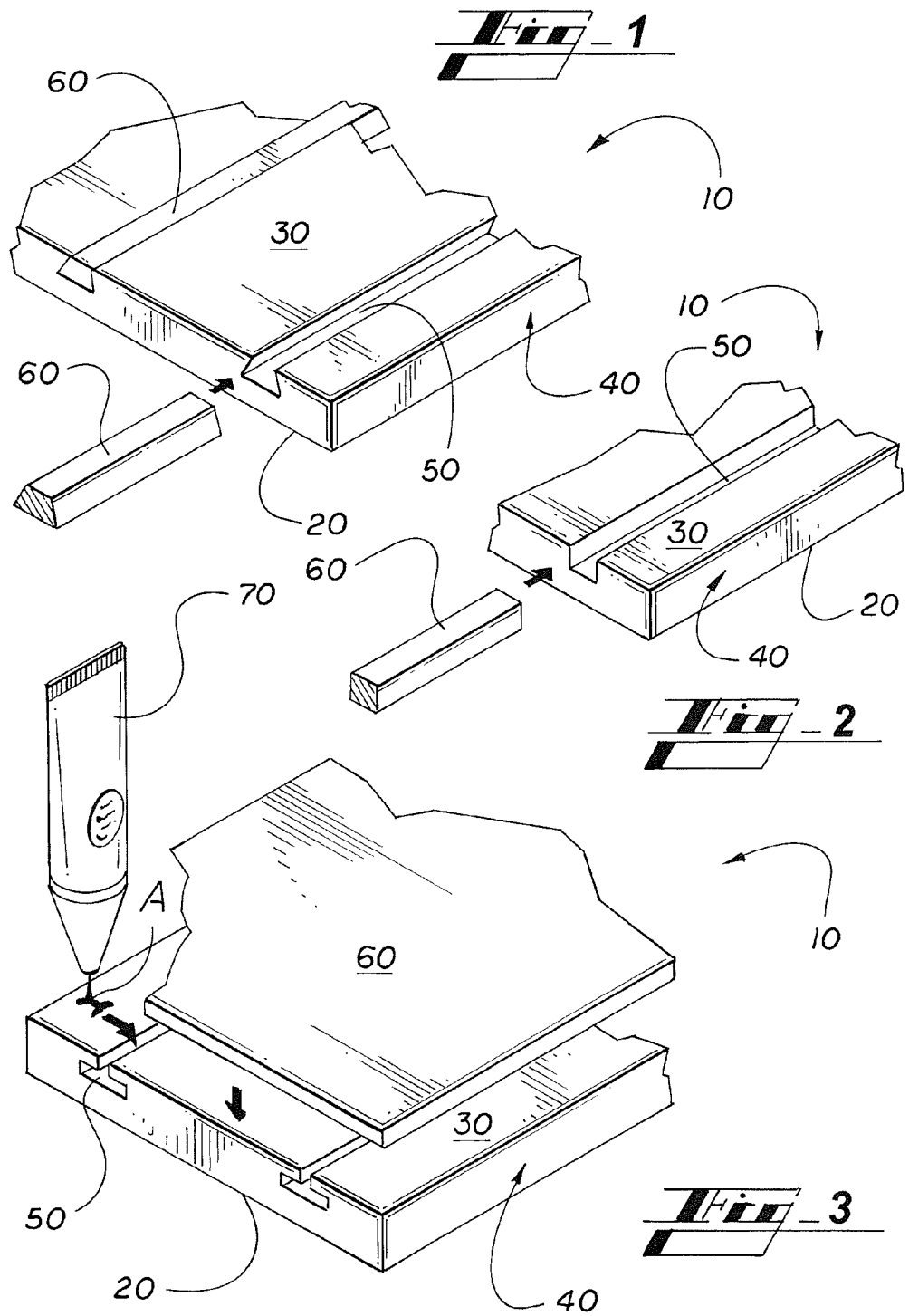

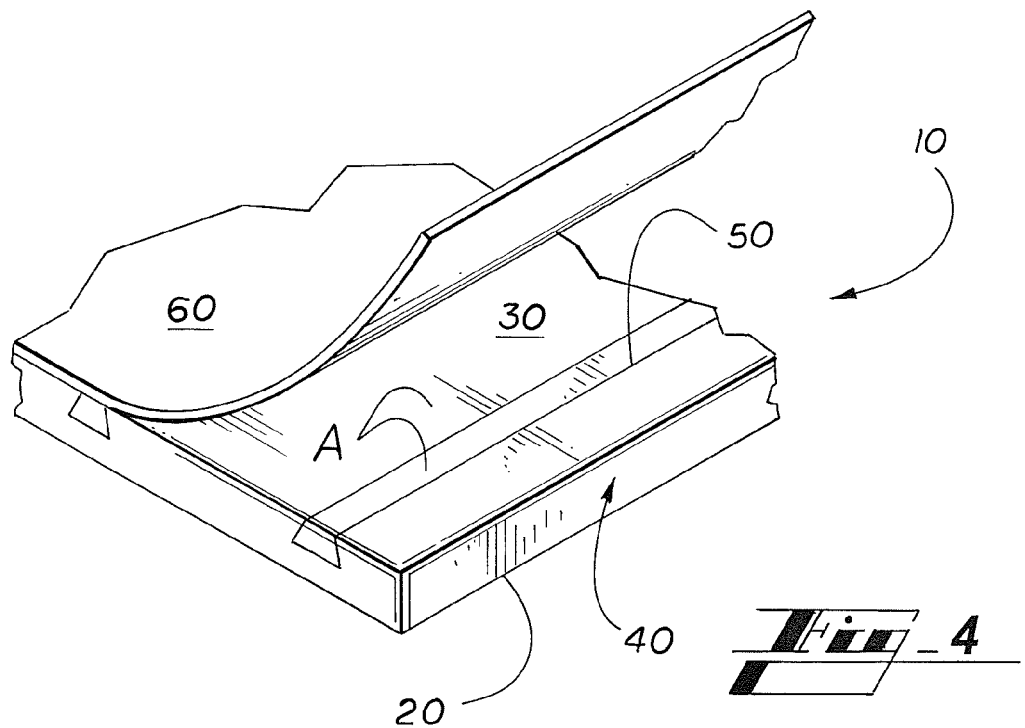
*Fig_4*
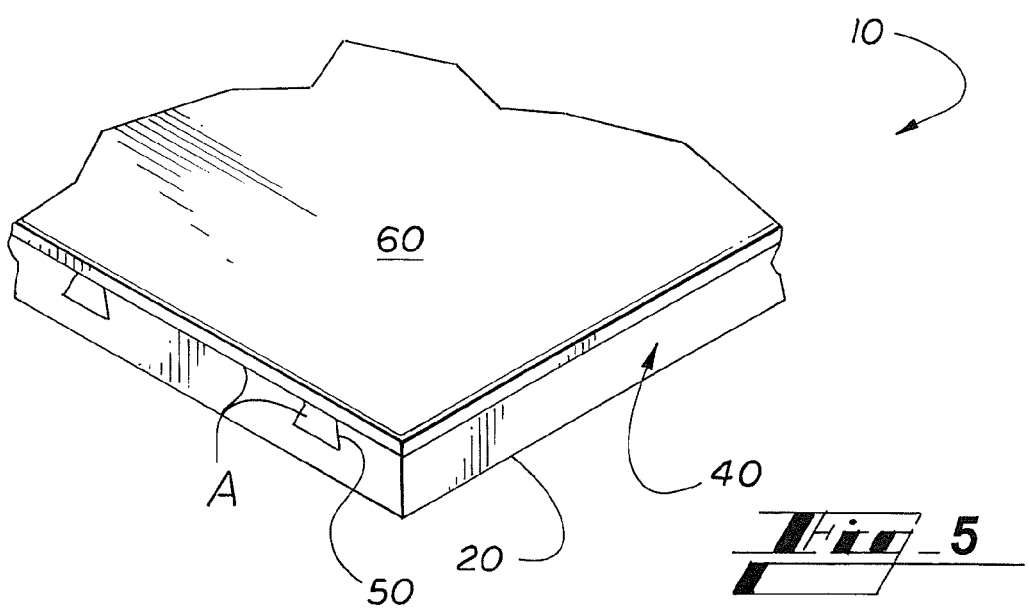
*Fig_5*

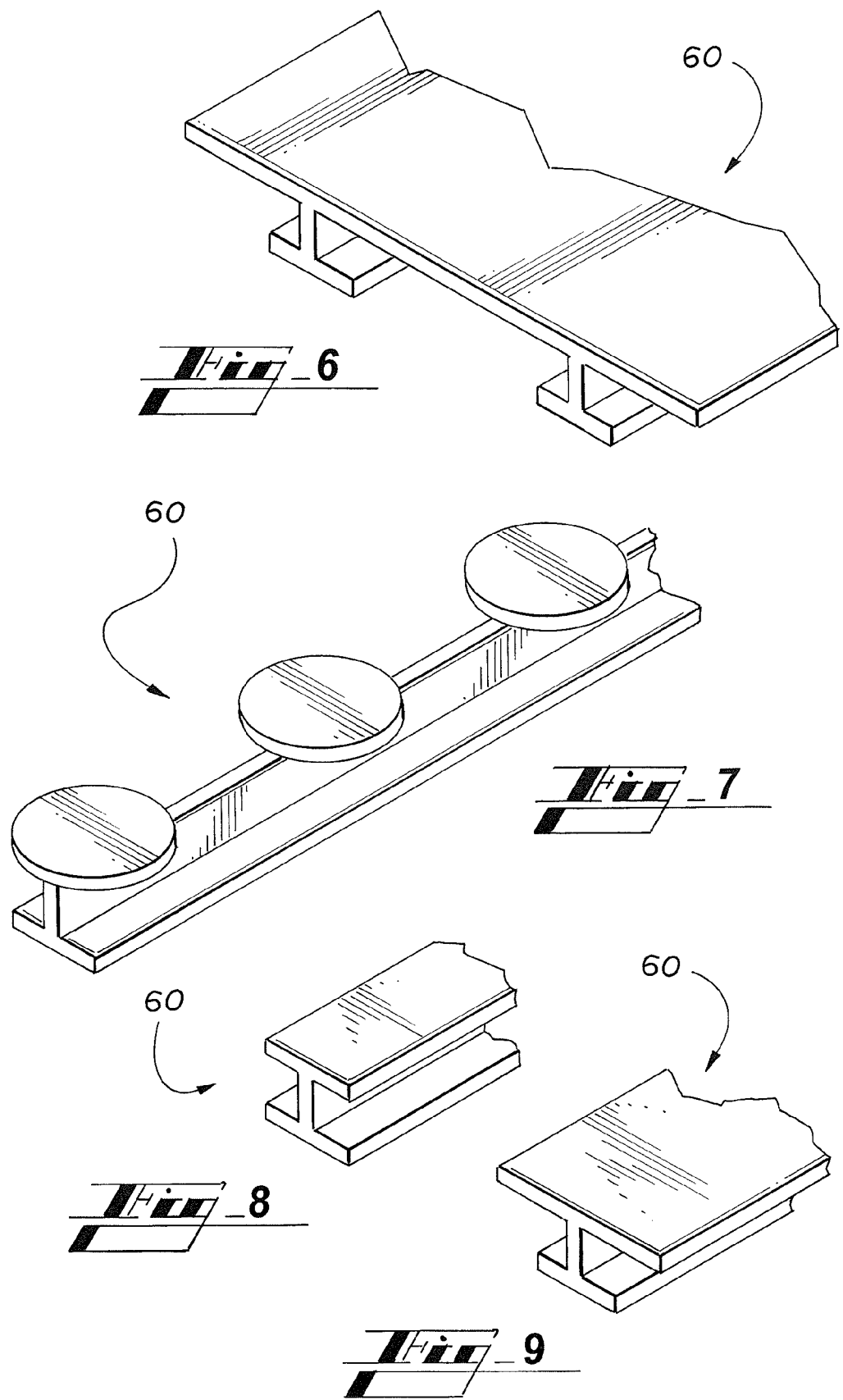

Fig_11

PROCESS OF PRODUCING A REMOVABLE MAGNETIC LINER

TECHNICAL FIELD

The present invention relates, generally, to liner products and to related processes for production and use thereof; and, more particularly, to removable liners attachable to a structure via magnetic means and comprising ultra-high molecular weight polyethylene (UHMWPE) or polyurethane rubber materials, and to methods of production, installation, and use thereof.

BACKGROUND OF THE INVENTION

Conventional liners are coverings used to protect a surface from wear, corrosive materials, adhering materials, or the like. Such liners can be used in any of a variety of commercial, industrial, and residential applications. Examples may include lining various material handling or transportation equipment surfaces, such as vehicle beds and tanks; railroad car beds and tanks; decks; construction equipment, such as buckets, conveyors, scrapers, or the like; mining equipment, such as screening media, lip liners, tube covers, side rails, and chute liners; farm equipment; or the like; or lining various bulk material storage areas, such as silos, chutes, bins, storage tanks, or the like.

Such liners most typically take one of two primary forms: (1) mechanically affixed liners and (2) spray-on or dip-applied coating liners. Consistent with the above-described purposes, mechanically affixed liners are often made of metal, plastic, wood, fiberglass, ultra-high molecular weight polyethylene material, and/or other like materials. Most often, such liners are permanently affixed to the substrate material or underlying product through attachment means such as adhesive(s), nails, screws, bolts and nuts, staples, mechanical cleats, magnetic means, or the like. Alternatively, it is common in the industry to apply a semi-permanent or permanent spray-on or dip-applied coating to a base material, in order to obtain a liner with advantageous properties.

For example, commercial liners for bulk storage uses may sometimes involve application of a permanent or semi-permanent, spray-on or dip-applied coating. Some such coatings are surface coatings only; some may chemically bond to the substrate material. Illustratively, in commercial mixers, the liner may be applied to the mixing tank surface; and in storage tank vessels, the liner may be applied to the tank walls. Advantageously, such liners tend to be relatively thin, lightweight, and cost effective to apply. The benefits of such liners to the end-user may include reduced-sticking of a contained material, and easier or more effective cleaning of the container, both of which may further result in a higher yield of the contained or stored product, a more cost effective process, and/or a cleaner or more sanitary process.

Disadvantageously, however, after a period of time, whether soon after heavy use, or after a few years of prolonged use, the spray-on type liner often begins to corrode, chip, spall, or peel away. The only viable solution is to remove and reapply the coating, resulting in downtime and additional expense to the user.

On the other hand, there exist various mechanically affixed liners, and, depending upon the materials used, and upon the intended application, these liners may provide benefits such as resistance to impact (including dent and scratch resistance), and resistance to puncture, corrosion, weather, ultraviolet light, ozone, biocontaminants (such as algae), chemicals, thermal extremes, or the like. Whether alternatively or in conjunction with the above-described benefits, such liners may further provide beneficial characteristics including impermeability, low or high surface friction, elasticity, rigidity, hardness, water tightness, and greater load bearing capacities, strength, toughness, and durability. Accordingly, such liners are often used in bulk storage areas in order to take advantage of one or more of the aforementioned beneficial characteristics, such as ease of cleaning, impermeability, corrosion resistance, impact resistance, and strength.

Presently emerging in the industry are thoughts of using ultra-high molecular weight polyethylene materials and polyurethane rubber materials in liners, due to certain desirable characteristics, including low permeability, high durability and impact resistance, and, depending upon the material and formulation, low or high surface friction characteristics. For example, ultra-high molecular weight polyethylene material exhibits low frictional characteristics and is, therefore, desirable for use in applications requiring a slick, non-stick surface. Polyurethane rubber materials exhibit high durability and resistance, and desirable moldability and shaping characteristics.

Thus, while beneficial and useful characteristics in certain important applications, these very same characteristics create a challenge for use as a removable liner. Specifically, UHMWPE material cannot easily be used as a removable liner. This is because UHMWPE material cannot be conveniently attached to a substrate without damage to the underlying substrate and to the liner, in large part due the physical properties of UHMWPE material. Specifically, and as discussed above, UHMWPE material is a low friction material and, therefore, adhesives will not adhere. Furthermore, thermal welding is difficult/impractical with the current state of manufacturing process technology. Likely for these reasons, there are no known easily removable liners utilizing UHMWPE material.

Specifically, available processes require mechanical attachment to the underlying substrate, often requiring modification of, or permanent structural change to, both the substrate and liner. For example, in the prior art, it is known to use brackets, cleats, and "nuts and bolts" to attach a liner sheet to a substrate material. Specifically, the prior art discloses the use of a protective liner retainer in combination with a panel attachment member to secure the retainer to a cargo panel of a cargo bed or other material handling bin, a liner attachment member with cleats for securing a protective liner to the retainer, and a support member for attaching the liner attachment member to the panel attachment member and for defining the thickness of liner that may be secured by the retainer by separating the panel attachment member and the liner attachment member. It is also contemplated in the prior art to attach brackets to the storage area via magnetizing with continuous use of cleats. However, no specific teaching is made for a removable liner that is bracket and cleat free.

It is apparent in the prior art that use of UHMWPE material as a liner for bulk storage requires substantial modification to the substrate material in order to use. Specifically, to attach the UHMWPE material, the present options in the prior art include drilling of holes, tapping of holes, addition of mechanical elements (such as brackets, cleats, screws, nuts and bolts, and the like) to the substrate material. As a result, the UHMWPE liners are not easily removable, and mere installation results in damage to the liner and/or the substrate. Furthermore, problems with use of the aforementioned connection means includes, corrosion, stress cracks, breakage, catching of stored materials, difficulty in cleaning, cross-contamination of contained product, and the like.

In sum, then, liners in the prior art require an extensive amount of effort to install and remove. Also, due to the means of attachment, damage to the substrate material may occur. This damage includes initial modification of the substrate surface to provide attachment points, with attendant scratching, gouging, holes, rusting, cracking, water penetration and damage, contained product seepage, contamination, drawdown, or the like.

Further disadvantageously, such liners in the prior art are prone to frequent replacement issues. Specifically, when the liners are installed using conventional nut and bolt attachment means, or the like, the liner material experiences an increased level of stress in focused portions of the UHMWPE material, which may result in stress cracking. Therefore, there is increased risk that the user will have to constantly replace the liner, resulting in additional and unnecessary costs to the user.

It is apparent that an industrially-viable, easily removable liner has not been contemplated in the prior art, especially with regard to the use of UHMWPE and polyurethane rubber materials, which can be applied to a substrate material without modification of the substrate material. Due to the widespread use of ferrous metals within industrial substrates, there is now presented an opportunity to develop a liner having novel means of attachment, while taking advantage of certain desirable, inherent properties of the selected liner materials, in order to provide a liner that is easily manufactured, easily applied, easily used, easily removed, and easily replaced; all without requiring deleterious modification of the substrate material and, thereby, avoiding or obviating the above-discussed attendant disadvantages of such deleterious attachment methods.

Therefore, what is needed in order to address the above-noted disadvantages and opportunities, but which has not heretofore been available, is a novel, removable, magnetically-affixed liner comprising ultra-high molecular weight polyethylene or polyurethane rubber materials, and related processes for producing, installing, and using said magnetic, removable liner. The liner is preferably configured so that the magnetic attachment means is not easily removed or dislodged from the liner, regardless of liner material choice. It is to such desirable ends that the following developments are presented.

BRIEF SUMMARY OF THE INVENTION

Briefly described, in a preferred embodiment, the apparatus, and process of the present invention overcome the above-mentioned disadvantages, and meet the recognized need, by providing a removable magnetic liner, and method for production, installation, and use thereof.

According to its major aspects, and broadly stated, an exemplary apparatus, and a method according to the present invention, provides a removable magnetic liner, preferably comprising an ultra-high molecular weight polyethylene (UHMWPE) or polyurethane rubber material. In an embodiment specifically advantageous for use with UHMWPE materials, one or more slot or groove is formed into the UHMWPE material. The slot or groove is preferably shaped to preclude or reduce tensile or shearing-type withdrawal of a contained element from said slot or groove. Disposed within said slot or groove, a contained element may comprise an adhesive, the adhesive filling, or partially filling, said slot or groove, and further bonded to a magnetic element disposed within, or overlying, said slot or groove. In such regard, the liner material may be heated at various stages to facilitate either, or both, forming the slot or groove and/or pressing the magnetic element into place.

The magnetic element may comprise any of a variety of shapes or forms, depending upon the desired magnetic strength, function, and intended application. Further alternatively, a combination of such magnetic attachment means may be utilized. Also disclosed are methods of production, installation, and use thereof.

In an alternative liner embodiment, best illustrated with polyurethane rubber materials, a magnetic attachment means is molded or cast into the polyurethane rubber material. Accordingly, disclosed are methods of production, installation, and use thereof.

Thus, one aspect of the present subject matter disclosure is to provide a removable magnetic liner that comprises UHMWPE material having a slot or groove formed therein and magnetic elements disposed therein or thereabove.

Another aspect of the present subject matter disclosure is to provide a removable magnetic liner that comprises adhesive material disposed, and subsequently cured, within a slot or groove formed into the UHMWPE material, and a magnetic element bonded to said adhesive and covering at least a portion of said UHMWPE material.

Yet another aspect of the present subject matter disclosure is to provide a liner embodiment, best utilized with polyurethane rubber materials, wherein a magnetic attachment means is molded or cast into the polyurethane rubber material.

Other useful considerations attendant the present subject matter disclosure include: configuration of the liner such that the magnetic attachment element is not easily removed or dislodged from the liner, regardless of liner material choice; provision of a liner that is easy to install and easy to remove; provision of a liner that protects the underlying substrate, rather than requiring deleterious modification of the substrate for attachment of the liner; provision of a liner that is less prone to excessive wear and tear; provision of a liner that is less prone to stress cracks; provision of a liner that is not easily dislodged from desired use, and not easily degraded by scuffing, scratching, weathering, and/or other deleterious effects over time.

These and other aspects of the apparatus and process of the present invention will become apparent to those ordinarily skilled in the art after reading the following Detailed Description of the Invention and Claims in light of the accompanying drawing Figures.

BRIEF DESCRIPTION OF THE DRAWINGS

The following specification is best read in conjunction with the accompanying drawing Figures, in which like reference numbers throughout the various drawing Figures designate like structure, and in which:

FIG. 1 is a perspective cut-away view of a first liner embodiment made in accordance with the present disclosure;

FIG. 2 is a perspective cut-away view of a second liner embodiment made in accordance with the present disclosure;

FIG. 3 is a perspective cut-away view of a third liner embodiment made in accordance with the present disclosure;

FIG. 4 is a perspective cut-away view of a step in producing a fourth liner embodiment made in accordance with the present disclosure;

FIG. 5 is a perspective cut-away view of a step in producing a liner embodiment of FIG. 4, made in accordance with the present disclosure;

FIG. 6 is a perspective cut-away view of one form of magnetic element made in accordance with the present disclosure;

FIG. 7 is a perspective cut-away view of another form of magnetic element made in accordance with the present disclosure;

FIG. 8 is a perspective cut-away view of another form of magnetic element made in accordance with the present disclosure;

FIG. 9 is a perspective cut-away view of another form of magnetic element made in accordance with the present disclosure;

Figure 10:
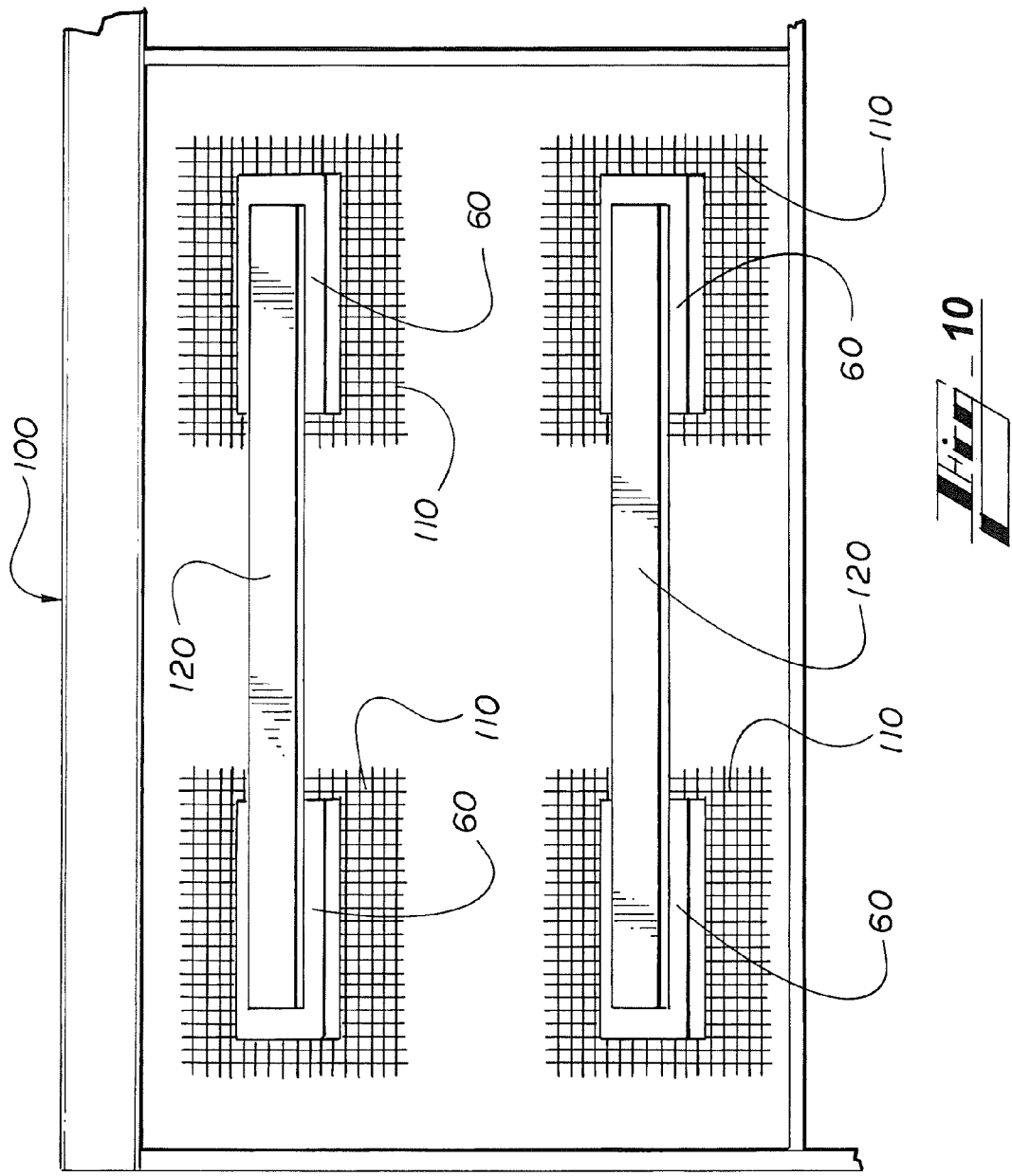
FIG. 10 is a perspective view of an alternate method of producing a liner embodiment made in accordance with the present disclosure.

It is to be noted that the drawing Figures presented are intended solely for the purpose of illustration and that they are, therefore, neither desired nor intended to limit the subject matter of the claimed invention to any or all of the exact details of construction shown, except insofar as they may be deemed essential to the claimed invention.

DETAILED DESCRIPTION OF ILLUSTRATIVE EMBODIMENTS

In describing preferred embodiments of the subject matter of the present subject matter, as illustrated in the drawing Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

Referring now more particularly to the drawing Figures, and to that embodiment of the invention here presented by way of illustration, FIG. 1 portrays a device made in accordance with the subject matter of the present disclosure. As shown in FIG. 1, liner 10 preferably comprises ultra-high molecular weight polyethylene (UHMWPE) sheeting of user-selected grade, and of minimum thickness sufficient to accommodate the details of construction set forth hereinbelow. Liner 10 has first side 20 and second side 30, comprising preferably flat, planar surfaces other than defined by edges 40 in a dimension of thickness.

In this example, first side 20 is intended to be the outward, working liner surface; that is, the side not facing a substrate material to which liner 10 will be attached. Conversely, in this example, second side 30 is the side that will be attached to a ferrous metal substrate.

Such substrates may take the form of material handling or transportation equipment surfaces, such as vehicle beds and tanks, railroad car beds and tanks, decks, construction equipment, farm equipment, or the like; or lining various bulk material storage areas, such as silos, chutes, bins, storage tanks, or the like. In this regard, UHMWPE is a preferred liner material due to its advantageous properties or characteristics, such as, by way of non-limiting example, low permeability, high durability and impact resistance, and low surface friction.

Because of the relative low friction characteristics of UHMWPE, wherein adhesives will not effectively adhere, however, means for affixing a magnetic element of sufficient strength to firmly, but removably, attach liner 10 to a ferrous substrate were developed, as more fully described and set forth hereinbelow.

Accordingly, in the embodiment of liner 10 shown in FIG. 1, one or more slot or groove 50 is machined or otherwise formed into surface 30. For purposes of this disclosure, a groove is defined as a longitudinal channel, preferably of less than full material depth, formed within surface 30; and a slot is defined as a truncated or shortened groove. For purposes of the remaining disclosures hereinbelow, the term, groove, will be utilized; however, it will be recognized by those of ordinary skill in the art that a slot, or a series of slots, could be substituted for a groove without departing from the scope or spirit of this disclosure.

Groove 50 is preferably shaped to preclude or reduce tensile or shearing-type withdrawal of a contained element from said slot or groove. Thus, as best seen with continuing reference to FIG. 1, groove 50 may be formed in a truncated triangular cross-section, best described when extended along the planar surface as a dovetail-shaped groove. A dovetail groove is desirable for use in association with the present subject matter due to its resistance to being pulled apart (i.e., tensile strength) from a complementary shaped element disposed therein.

Groove 50 is sized to accommodate magnetic element 60. Magnetic element 60 may be, for example, any of a variety of formulations taking the shape, in this instance, of a bar magnet. Magnetic element 60 is formed, by machining or the like, to take a complementary shape for insertion into groove 50, as by sliding longitudinally thereinto.

It is here noted that, in order to achieve adequate workability of liner 10 for insertion of magnetic element 60 into groove 50, the temperature of the UHMWPE material may be elevated. For example, it has been found that a material temperature of approximately 100 degrees Fahrenheit provides sufficient workability to construct liner 10 as described hereinabove. Similarly, the temperature of magnetic element 60 may be elevated, for example, to a temperature of approximately 150 degrees Fahrenheit, to assist the assembly process.

In this manner, useful liner 10 is accordingly relatively simply formed from a material, UHMWPE, which is otherwise not suitable for the intended purposes as a liner. Liner 10, so formed, may be placed upon a ferrous substrate, with side 30 disposed against the ferrous substrate. The relative attachment strength between liner 10 and its ferrous substrate may be adjusted by designing liner 10 with a sufficient number of groove and magnet elements per square unit length (e.g., inch, yard, centimeter, meter, or the like) to achieve the desired holding strength. Alternatively, or additionally, magnetic elements 60 may be designed to provide stronger or weaker magnetic density. With this construction, liner 10 advantageously may be easily fitted into a required location and position, with that location and position being changeable by a user lifting or prying liner 10 from its position and repositioning it as desired. Removal is similarly simple, through the user's action in lifting or prying liner 10 away from the surface of the ferrous substrate.

Moving now to FIG. 2, an alternative embodiment of liner 10 is shown. In this embodiment, liner 10, and each enumerated element thereof, takes equivalent structure, form, and function as described above with regard to the embodiment of FIG. 1, except insofar as detailed below. In this embodiment, groove 50 takes the form of a rectangular groove, and magnetic element 60 takes the form of a rectangular bar-type magnet. In this embodiment, however, in order to achieve sufficient tensile strength, groove 50 is preferably slightly undersized as compared to the size of magnetic element 60, such that a "press-fit" is obtained in the assemblage. As detailed above, an elevated UHMWPE working temperature, sufficient for material plasticity, but less than would be required to exceed the material yield strength, may be helpful in achieving a correct fit between the parts. As further detailed above, the temperature of magnetic element 60 may also, or alternatively, be increased for such purposes.

Moving now to FIG. 3, an alternative embodiment of liner 10 is shown. In this embodiment, liner 10, and each enumerated element thereof, takes equivalent structure, form, and function as described above with regard to the embodiment of FIG. 1, except insofar as detailed below. In this embodiment, groove 50 takes the form of a groove of T-shaped cross-section, and magnetic element 60 takes the form of a sheet-type magnet. In this embodiment, however, an adhesive compound, adhesive A, is dispensed from container 70 and onto surface 30. In order to achieve sufficient tensile strength with magnetic element 60, however, groove 50 is preferably utilized to capture an excess of adhesive A, such that groove 50 is filled in excess of its capacity; to wit, above surface 30. Alternatively, it will be recognized by those of ordinary skill in the art that groove 50 may be entirely filled through its length, or spaced-apart sections thereof may be filled.

Adhesive A is further spread across either the entirety of surface 30, or across selected area(s) thereof, in sufficient quantity and thickness as may be desirable for the intended purposes described herein. Magnetic element 60 is thereafter pressed downwardly onto surface 30, either as a full sheet, or in sections, or in continuous downwardly flexing motion, whereafter air bubbles may be smoothed from underneath, as is known to do in the art.

Believed to be unique in this field and for these purposes, when adhesive A cures, it takes the form of groove 50. Thus, for the exemplary UHMWPE material discussed hereinabove, even though adhesive A will not likely bond in sufficient strength to surface 30 to form an effective bond with magnetic element 60, it will sufficiently bond directly to magnetic element 60. Thus, when adhesive A cures, magnetic element 60 is accordingly bonded to adhesive A, which is, in turn, captured firmly within groove 50.

Turning now to FIG. 4, an alternative embodiment of liner 10 is shown. In this embodiment, liner 10, and each enumerated element thereof, takes equivalent structure, form, and function as described above with regard to the embodiment of FIG. 1, except insofar as detailed below. In this embodiment, groove 50 takes the form of a groove of dovetail cross-section, and magnetic element 60 takes the form of a sheet-type magnet. The embodiment of FIG. 4, accordingly, visually demonstrates formation of liner 10 according to the process described hereinabove with regard to the embodiment of FIG. 3. In turn, FIG. 5 depicts a finished liner 10 produced according to the process of the embodiment described hereinabove with reference to FIGS. 3 and 4.

The reader now having the benefit of, and understanding provided by, descriptions for producing the liner embodiments shown in FIGS. 1 through 3, we turn to FIGS. 6-9, wherein are shown alternative embodiments of magnetic element 60. FIG. 6 depicts magnetic element 60 formed, for example, by extrusion process, as a magnetic sheet preferably integrally formed with one or more T-shaped element for insertion into a mating T-shaped groove (see, e.g., FIG. 3) of liner 10.

Similarly, FIG. 7 depicts an alternative embodiment of magnetic element 60 formed with one or more spaced-apart "button"-type magnets disposed upon one or more T-shaped element for insertion into a mating T-shaped groove (see, e.g., FIG. 3) of liner 10. Such an embodiment may be useful in applications where spot affixation of liner 10 is more appropriate than the construction forms provided by the embodiments of FIGS. 1-3.

Likewise, FIG. 8 depicts an alternative embodiment of magnetic element 60 formed in a "rail" or I-beam type construction. Such an embodiment conveniently may be formed, for example, by an extrusion process or the like. In this embodiment, one T-shaped end is enabled for insertion into a mating T-shaped groove (see, e.g., FIG. 3) of liner 10.

As in FIG. 8, FIG. 9 depicts an alternative embodiment of magnetic element 60 formed in a different "rail"-type construction. Such an embodiment conveniently may be formed, for example, by an extrusion process or the like. In this embodiment, one T-shaped end is enabled for insertion into a mating T-shaped groove (see, e.g., FIG. 3) of liner 10, whereas the broader T-shaped end, is more sheet-like for attachment via greater magnetic surface area onto the ferrous substrate.

Although the embodiments of magnetic element 60 shown in FIGS. 6-9 are depicted as being of integral construction, it will be understood that any such embodiment may be formed of separate portions and joined together in any manner known in the joining arts. Additionally, it will be recognized that surfaces of magnetic elements 60 intended to attach to the ferrous substrate may be magnetic, whereas the portions intended to attach to liner 10 may be of any material, magnetic or otherwise.

Yet additionally, although depicted in FIGS. 6-9 as having T-shaped portions intended to attach to liner 10, such portions of magnetic elements 60 may be of any shape disposed for mating with liner 10 in any manner hereinabove described, or in any manner otherwise within the scope and spirit of the disclosure hereof. In that regard, such attachment portions may be dovetail shaped, T-shaped, rectangularly shaped, or otherwise, so long as sufficient for the purposes and applications described hereinabove. Conversely, the form and nature of groove 50 may be selected by the user in order to accommodate the nature of the magnet selected for use in the intended liner application.

Figure 11:
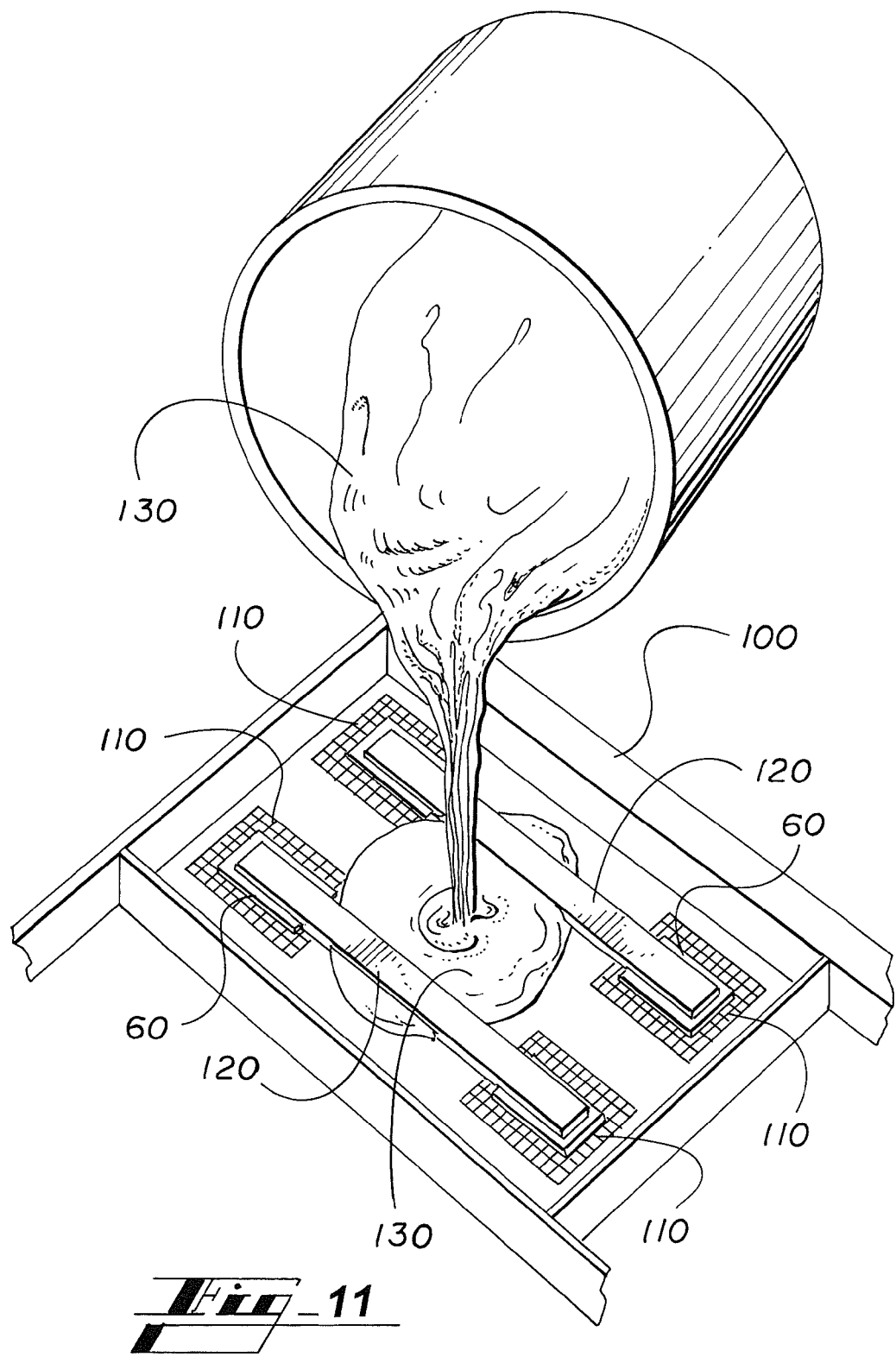
FIG. 11 is a perspective view of a further step in producing the liner embodiment of FIG. 10, made in accordance with the present disclosure.
Figure 12:
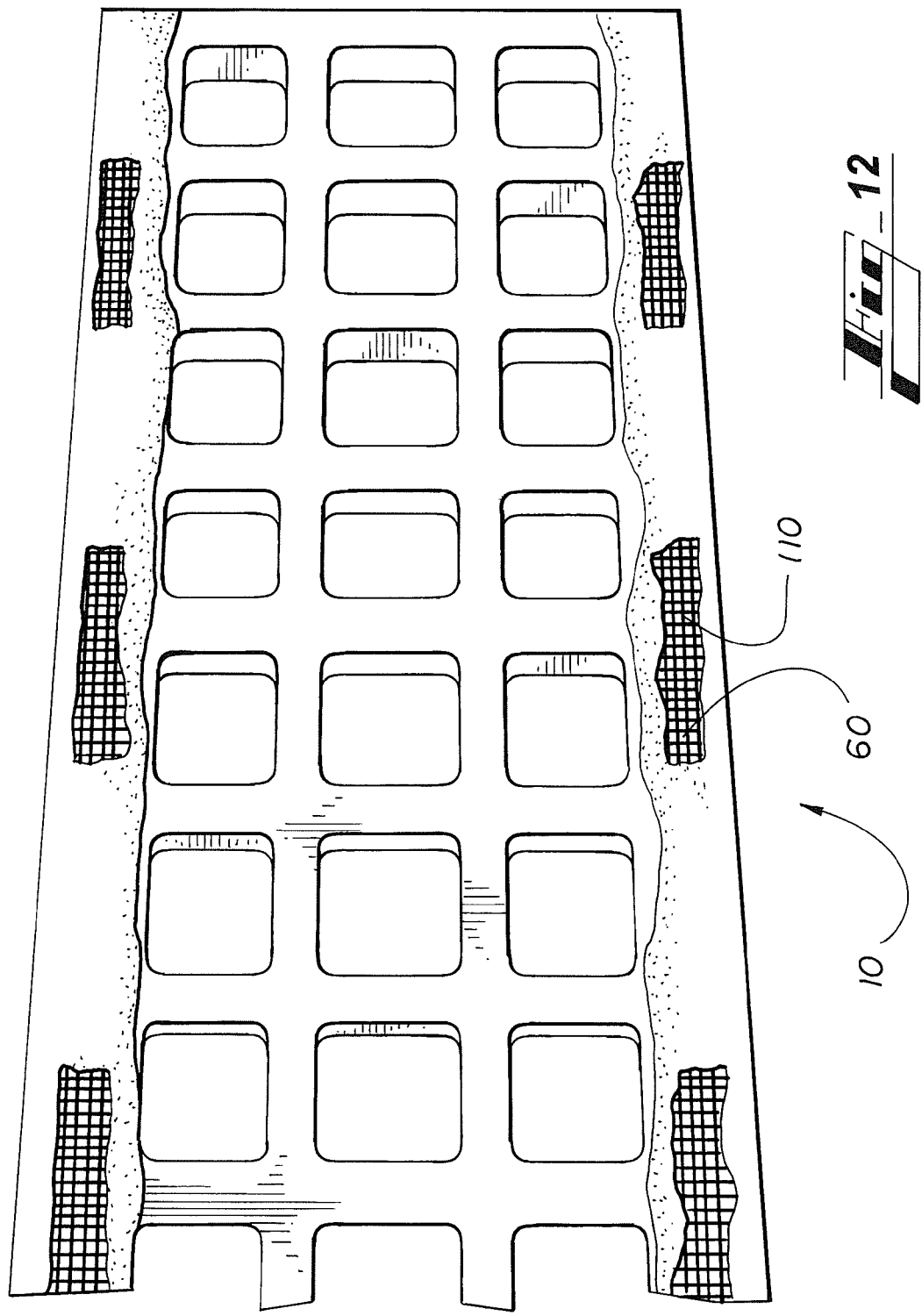
FIG. 12 is a perspective view of another form of liner produced in accordance with the alternate method of FIGS. 10 and 11.

Turning now to FIGS. 10-12, an alternative method of construction of liner 10 is shown. In this example, however, liner 10 is preferably formed of polyurethane rubber material. Such material may be selected for ease of molding into a desired shape and form, and for use in applications conducive to the well-known desirable properties and characteristics of this material.

As depicted in FIG. 10, a mold 100 is assembled or otherwise provided. Into mold 100 are preferably placed one or more reinforcing, woven or non-woven, mesh material 110, of sufficient number and size for the intended application. Placed upon mesh material 110 are one or more magnetic elements 60, shown as rectangular, bar-type magnets. For suitable applications, one or more ferrous band 120 is placed atop, and bridging, selected magnetic elements 60. Ferrous band 120, typically steel, is so placed in order to interlink magnetic elements 60 and, thereby, spread the magnetic flux. It will be apparent to those of ordinary skill in the art that mesh material 110 may be omitted in those circumstances wherein reinforcement of the magnetic elements and/or liner surface is not required to meet the intended application.

Turning now to FIG. 11, a further process step is demonstrated. In this step, liquid (emulsified) polyurethane rubber material 130, of user selected formulation sufficient for the intended application, is poured or injected into mold 100. When mold 100 is filled to sufficient depth, the loaded mold is set aside to cure. Curing may occur according to any known process effective for the polyurethane rubber material utilized, whether in elevated temperature environs, or otherwise. When the polyurethane rubber material is sufficiently cured, liner 10 is demolded and is thereafter available for an intended use.

Although liner embodiments depicted within FIGS. 1-11 have been illustrated as flat, planar sheet-like liners, it will be apparent to those of ordinary skill in the art that other liner forms and structures may be formed commensurate with the disclosures made herein. Accordingly, and for merely illustrative purposes, FIG. 12 depicts an alternative embodiment of liner 10 not in continuous sheet-like form. In FIG. 12, and formed by the process described hereinabove with regard to FIGS. 10-11, liner 10 is depicted as an open lattice structure, wherein, for example, material weight may be spared, airflow increased, or the like. Such embodiments are limited only by the imagination and ingenuity of the liner designer.

Furthermore, although two specific material choices have been described hereinabove for use with liner 10, namely, UHMWPE and polyurethane rubber, it will be recognized that any material conducive to use, formation, and manufacture in accordance with the subject matter disclosure provided herein may be used. All such materials are intended to be covered within this disclosure as though fully named and described herein.

Liner 10, thus produced as described hereinabove, or through equivalents within the scope and spirit of the disclosure hereof, are seen to provide certain useful characteristics, including: configuration of liner 10 such that magnetic element 60 is not easily removed or dislodged from liner 10, regardless of liner material choice; provision of liner 10 that is easy to install and easy to remove; provision of liner 10 that protects the underlying substrate, rather than requiring deleterious modification of the substrate for attachment of the liner; provision of liner 10 that is less prone to excessive wear and tear; provision of liner 10 that is less prone to stress cracks; provision of liner 10 that is not easily dislodged from desired use, and not easily degraded by scuffing, scratching, weathering, and/or other deleterious effects over time, to name but a few.

It will therefore be understood that the particular embodiment of the subject matter here presented is by way of illustration only, and is, in no way, meant to be restrictive; therefore, numerous changes and modifications may be made, and the full use of equivalents resorted to, without departing from the spirit or scope of the subject matter as provided in the appended claims.

What is claimed:

1. A process for producing a liner for attachment to a ferrous substrate comprising the steps of:
   a. positioning a mesh material in a mold;
   b. positioning a magnetic element upon said mesh material;
   c. filling said mold with liner material;
   d. allowing said liner material to harden; and
   e. demolding a liner part;
   whereby, upon completion of steps a-e, a liner is formed that may be attached to the ferrous substrate and removed by a user through lifting the liner away from the substrate material;
   further, comprising the steps of:
   a'. positioning a plurality of mesh materials in said mold;
   b'. positioning a magnetic element upon each of said mesh materials; and
   b". positioning a ferrous element in contact with at least two selected magnetic elements.

2. The process of claim 1, wherein said liner material is one of a liquid material, a flowable material, a polyurethane material, a polyethylene material and a rubber material.

3. The process of claim 1 wherein said allowing step further comprises curing the liner material.

4. A process for producing a liner for attachment to a ferrous substrate comprising the steps of:
   a. positioning a plurality of magnetic elements within a mold;
   b. positioning a ferrous element to be in contact with at least two selected magnetic elements;
   c. filling said mold with a liner material;
   d. allowing said liner material to harden; and
   e. demolding a liner part;
   whereby, upon completion of steps a-e, a liner is formed that may be attached to the ferrous substrate and removed by a user through lifting the liner away from the substrate material.

5. The process of claim 4, wherein said filling step further comprises filling said mold with said liner material which is one of a liquid material, a flowable material, a polyurethane material, a polyethylene material and a rubber material.

6. The process of claim 4 wherein the positioning step of the plurality of magnetic elements further comprises spacing said two selected magnetic elements from one another and said positioning step of said ferrous element further comprises bridging said two selected and spaced magnetic elements with said ferrous element.

7. The process of claim 4 wherein a face of each of the magnetic elements is exposed on a face of the formed liner.

8. The process of claim 7 further comprising:
   embedding a flange extending from at least one of the magnetic elements in the liner material.

9. The process of claim 4 further comprising:
   forming an open lattice structure in the liner part.

10. The process of claim 4 further comprising:
    heating the magnetic elements prior to the filling step.

11. The process of claim 4 wherein said allowing step further comprises curing the liner material.

12. A process for producing a device for attachment to a ferrous substrate comprising the steps of:
    a. positioning a plurality of magnetic elements within a mold;
    b. positioning a ferrous element to be in contact with at least two selected magnetic elements;
    c. filling said mold with a formable material;
    d. forming an open lattice structure in the material;
    e. allowing said formable material to harden; and
    f. demolding a part;
    whereby, upon completion of steps a-f, a device having an open lattice structure is formed that may be attached to the ferrous substrate and removed by a user through lifting the device away from the substrate material.

13. The process of claim 12, wherein said filling step further comprises filling said mold with said formable material which is one of a liquid material, a flowable material, a polyurethane material, a polyethylene material and a rubber material.

14. The process of claim 12 wherein the positioning step of the plurality of magnetic elements further comprises spacing said two selected magnetic elements from one another and said positioning step of said ferrous element further comprises bridging said two selected and spaced magnetic elements with said ferrous element.

15. The process of claim 12 wherein a face of each of the magnetic elements is exposed on a face of the formed device.

16. The process of claim 15 further comprising:

embedding a flange extending from at least one of the magnetic elements in the formable material.

17. The process of claim 12 further comprising:

heating the magnetic elements prior to the filling step.

18. The process of claim 12 wherein said allowing step further comprises curing the formable material.

19. A process for producing a device for attachment to a ferrous substrate comprising the steps of:
   a. positioning a plurality of magnetic elements;
   b. positioning a ferrous element to be in contact with at least two selected magnetic elements;
   c. embedding the plurality of magnetic elements and the ferrous element in a material;

whereby, upon completion of steps a-c, a device is formed that may be attached to the ferrous substrate and removed by a user through lifting the device away from the substrate material.

\* \* \* \* \*